Sept. 9, 1958     P. N. ERICKSON ET AL     2,851,283
FIFTH WHEEL LOWER COUPLER MOUNTING Filed Nov. 18, 1955     4 Sheets-Sheet 1

INVENTORS
Paul N. Erickson
Hans Locher
BY
Harness, Dickey & Pierce
ATTORNEYS

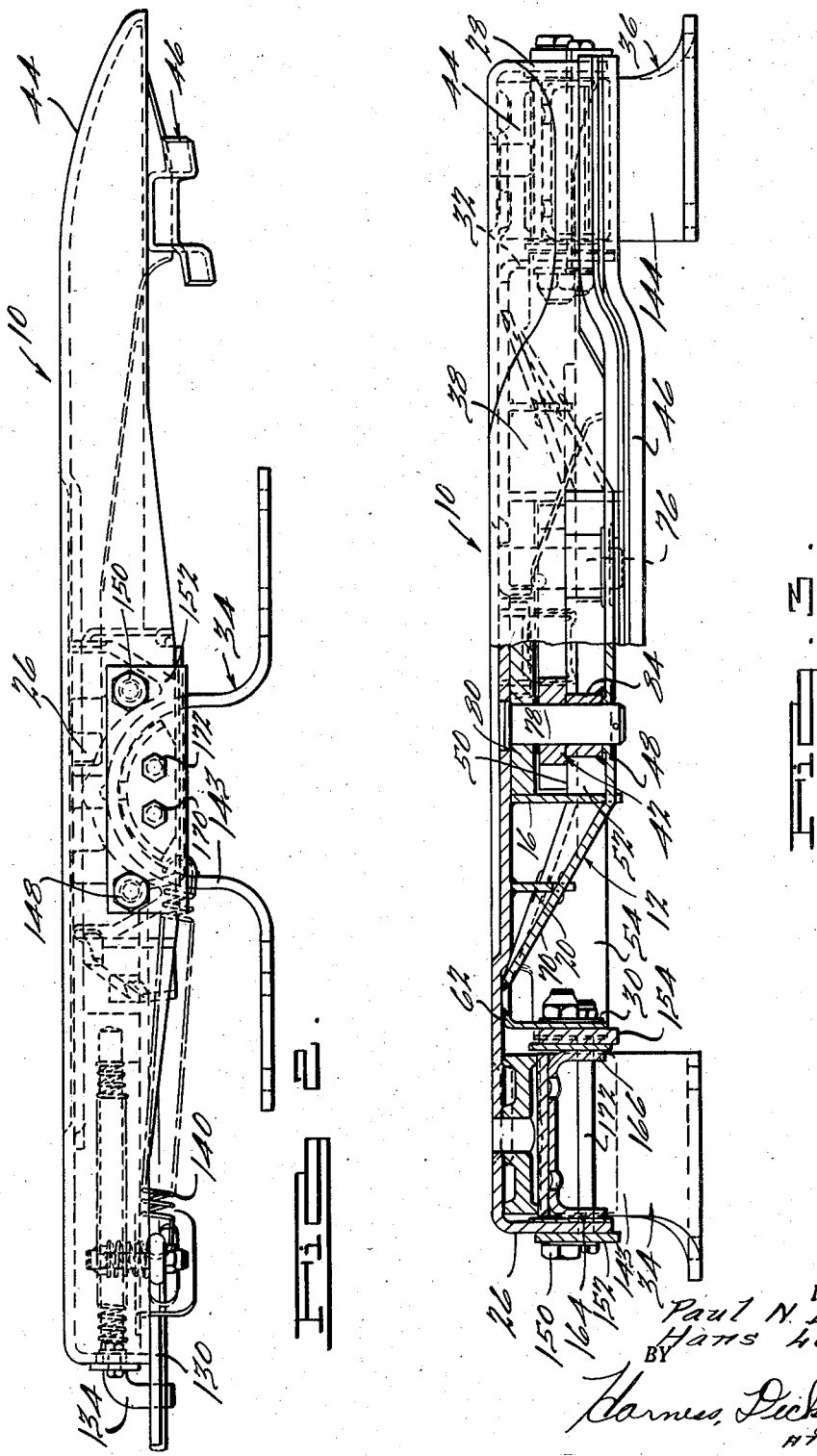

Sept. 9, 1958 P. N. ERICKSON ET AL 2,851,283
FIFTH WHEEL LOWER COUPLER MOUNTING
Filed Nov. 18, 1955 4 Sheets-Sheet 3

INVENTORS
Paul N. Erickson
Hans Locher
BY
Harness, Dickey & Pierce
ATTORNEYS

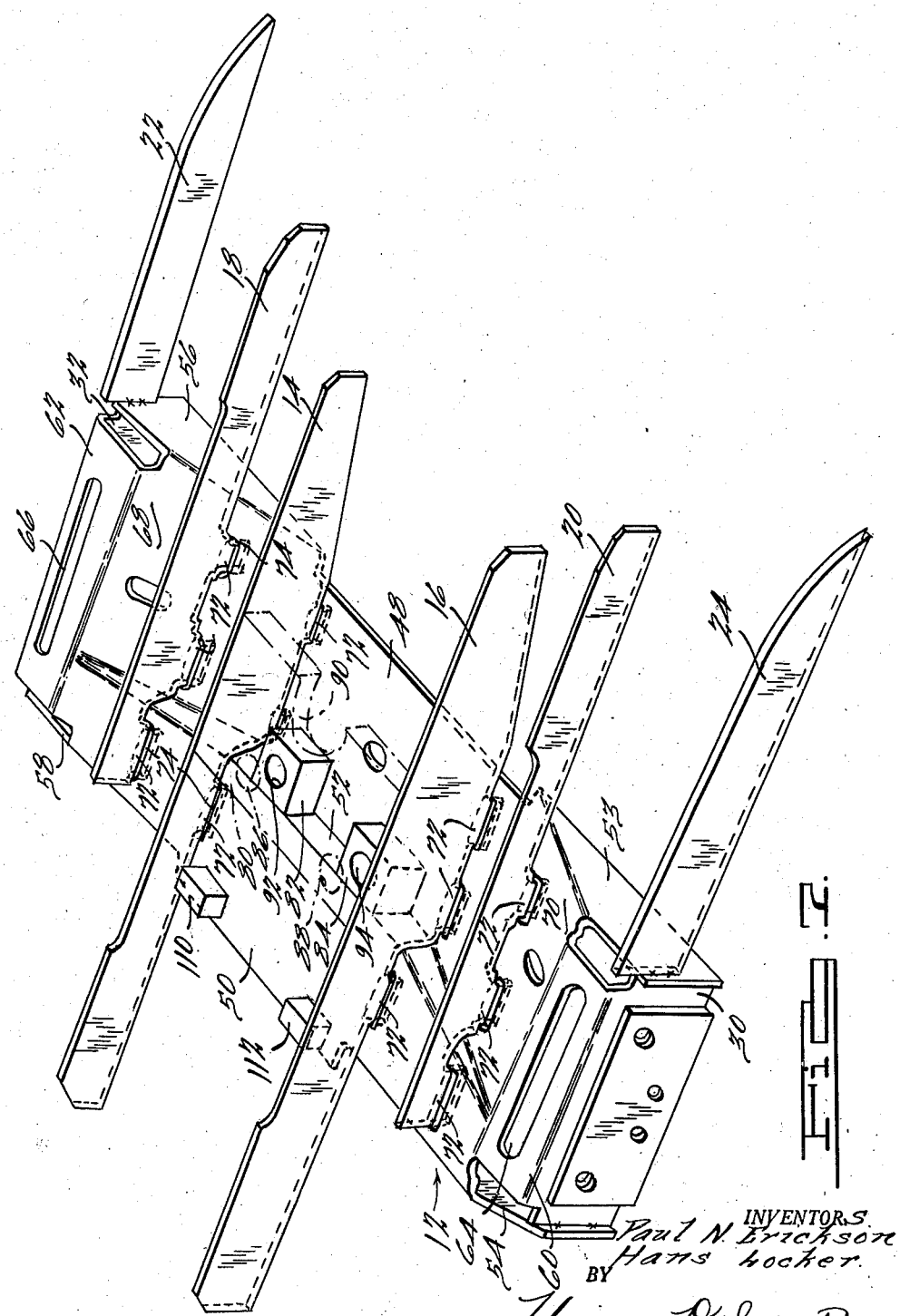

United States Patent Office 2,851,283
Patented Sept. 9, 1958

2,851,283

FIFTH WHEEL LOWER COUPLER MOUNTING

Paul N. Erickson, Detroit, and Hans Locker, Utica, Mich., assignors to Fruehauf Trailer Company, Detroit, Mich., a corporation of Michigan Application November 18, 1955, Serial No. 547,717

13 Claims. (Cl. 280—435)

This invention relates to fifth wheel lower couplers for truck tractors and the like.

It is important in the manufacture of trailers to maintain weight at a minimum. Most states have maximum weight laws which limit the total weight of the loaded carrier. Once the maximum total weight has been reached the pay load in any particular trailer cannot be increased. At this point, the only way to increase the pay load is to reduce the weight of the carrier. Since the amount of pay load that can be carried by a truck-trailer determines the profit or loss of the trucker, the weight of the carrier is a primary consideration. From the standpoint of the manufacturer, the weight factor is always an important consideration and may even be the controlling factor affecting sale of the equipment.

This invention is a lower coupler construction that is much lighter in weight than couplers conventionally used. Heretofore, the supporting or bearing plate of the coupler has been a large, heavy casting. This has been deemed necessary as this plate supports the front end of the trailer and connects with the kingpin to fasten the trailer and tractor together. It is required to carry very heavy loads and is subjected to extreme operating stresses. The problem has been to produce a lightweight coupler that is sufficiently strong and rugged to stand up under treatment and abuse to which it is subjected in use.

Our solution to this problem is a uniquely formed sheet-metal structure for the coupler. The sheet-metal construction, of course, makes the coupler much lighter in weight and permits the pay load of the trailer to be correspondingly increased.

In the drawings forming a part of this specification and wherein like numerals are employed to designate like parts throughout the same:

Fig. 2 is a side elevational view thereof;

Fig. 3 is a sectional view taken on the line 3—3 of Fig. 1;

Fig. 7 is a perspective view showing the understructure of the coupler.

Considered in certain of its broader aspects, the lower coupler structure of this invention comprises a formed sheet-metal bearing or supporting plate 10 strengthened and reinforced by an understructure in the form of a transverse sheet-metal beam 12. The middle portion of the beam 12 is depressed so as to be spaced from the plate 10, and upright sheet-metal struts 14, 16, 18, and 20 interposed between the plate 10 and the depressed portion of the beam further strengthen and reinforce the plate and particularly the portions of the plate which extend to the front and to the rear of the beam. Two additional outer struts 22 and 24 are provided to strengthen and reinforce the side portions of the plate.

Figure 1:
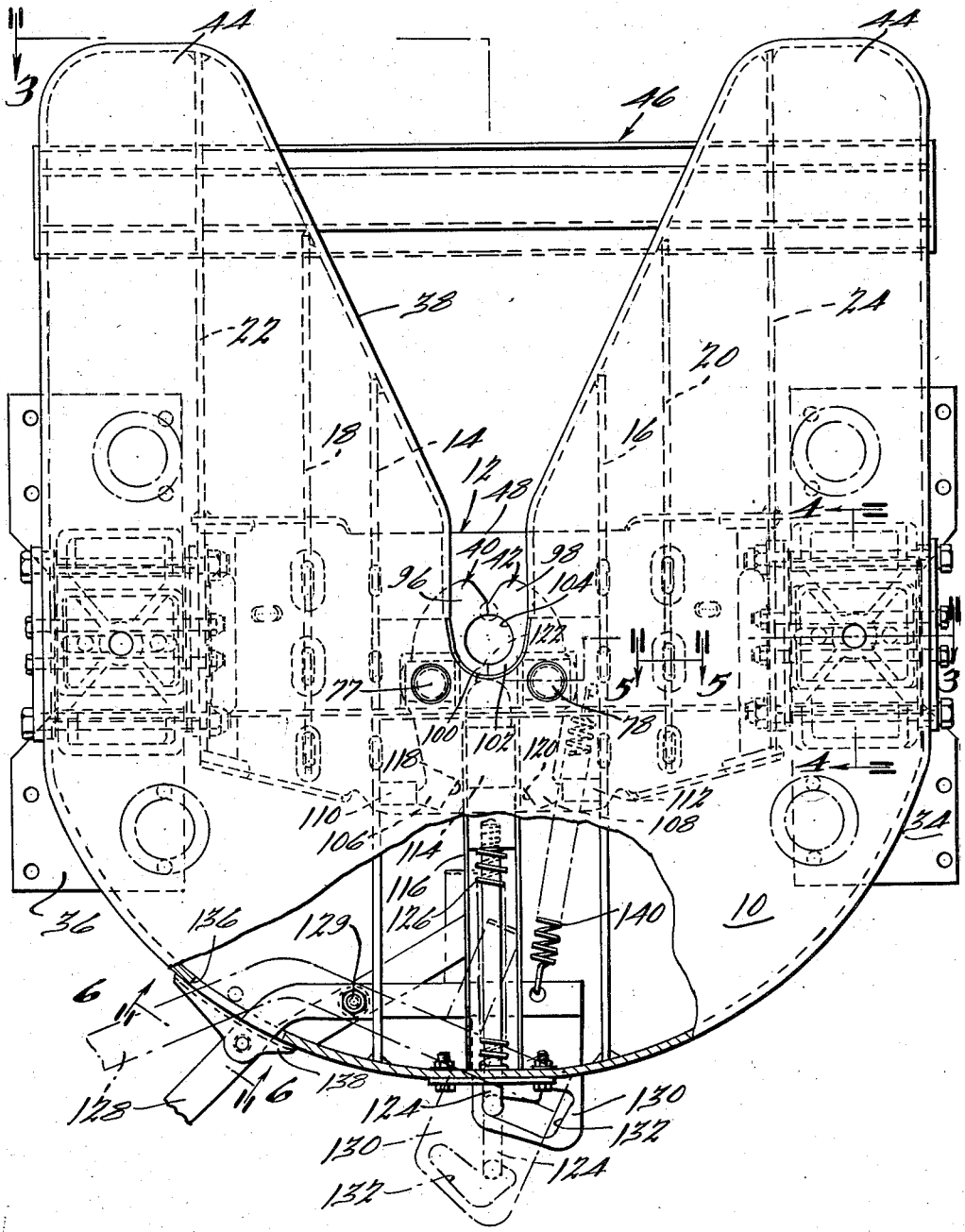
Fig. 1 is a top plan view of a lower coupler embodying the invention.

As perhaps best shown in Figs. 1 and 3, the plate 10 extends laterally beyond the ends of the beam 12, and the projecting portions thereof are formed with depending flange portions 26 and 28 which co-operate with depending flanges 30 and 32 at the ends of the beam to define means for rockably or tiltably mounting the plate on suitable upright supports 34 and 36.

A V slot 38 is provided in the rear edge of the plate 10 to receive the trailer kingpin in the conventional manner, and kingpin hooks 40 and 42 are pivotally mounted between the plate and the depressed middle portion of the beam 12 to engage the trailer kingpin. Suitable means are provided for locking the hooks 40 and 42 in the engaged position so that they cannot inadvertently disengage the kingpin and release the trailer.

While the above elements comprise the basic invention, it will be readily appreciated that features of the invention also reside in the particular manner in which these elements are individually formed and in the manner in which they are correlated in the combination. These factors all contribute in varying degrees to the strength and durability which enagles the welded sheet-metal unit of this invention to withstand the exceedingly severe operating conditions to which it is subjected. As suggested, the lower coupler carries the full weight at the forward end of the trailer, it is subjected to impacts of considerable magnitude during coupling and uncoupling of the trailer, and it must withstand almost continual stress and strain when the tractor and trailer are in motion. The coupler must be exceedingly strong and rigid, and it must be capable of sustaining damaging blows and impacts to which it is subjected in use. The instant construction has proved to be pre-eminently satisfactory in this respect. It stands up under all conditions of use and is additionally advantageous in that it has but a fraction of the weight of conventional couplers.

The top plate 10 may assume any desirable or conventional form, but it preferably has the plan shape shown in Fig. 1. The plate 10, of course, must be sufficiently large to perform its intended function and it must be sufficiently wide to accommodate the V slot 38. The latter preferably is relatively wide at its outer end to facilitate coupling of the trailer and to guide the kingpin into the inner end or base of the slot for engagement by the kingpin hooks 40 and 42. The rear portion of the plate 10, at opposite sides of the slot 38, preferably curve downwardly as at 44 toward the rear edge of the plate. A depending flange is formed around substantially the entire periphery of the plate 10 to strengthen and reinforce the same. In the construction here shown, the peripheral flange extends continuously along the entire edge of the plate except for the apex of the V slot 38, and this flange includes the two side flange portions 26 and 28 referred to above. A transverse tie member 46 is welded to the underside of the plate 10 across the V slot 38 to strengthen and reinforce the adjacent portions of the plate and to prevent the latter from spreading or distorting when the upper coupler assembly rides up onto the plate. As suggested, the plate 10 normally is tilted downwardly and rearwardly preparatory to the coupling operation, and when the plate is in this position the tie member 46 is lower than the normal position of the kingpin so as not to interfere with the entry thereof into the V slot 38. If necessary or desirable, the tie member 46 can be arched downwardly to assure proper clearance for the kingpin.

The beam 12 is of generally elongate rectangular conformation in plan as best shown in Fig. 7 and, as suggested, the middle portion of the beam is depressed below the plate. It is significant to note in this connection that the rearward portion 48 of the beam 12 is depressed or bent downwardly farther than the forward portion 50 thereof to define a longitudinally extending, vertically formed step or shoulder 52 at substantially the middle of the beam. Side flanges 53 and 54 at one end of the beam 12 butt against and are welded to the end flange 30, and side flanges 56 and 58 at the other end of the beam butt against and are welded to the end flange 32. The boxed ends thus provided, together with the vertical shoulder 52, materially strengthen and reinforce the beam 12. Flat top portions 60 and 62 at the ends of the beam 12 bear against and are welded to the undersurface of the plate 10, the welding material being introduced through elongate slots 64 and 66 in the top portions. As suggested, the beam 12 is disposed substantially midway between the sides of the plate 10; and, as shown in Fig. 1, with the shoulder 52 spaced slightly forwardly of the apex of the V slot 58.

Figure 5:
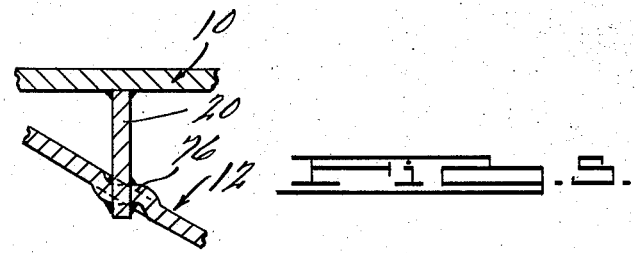
Fig. 5 is an enlarged, fragmentary, vertical sectional view taken on the line 5—5 of Fig. 1.
Figure 6:
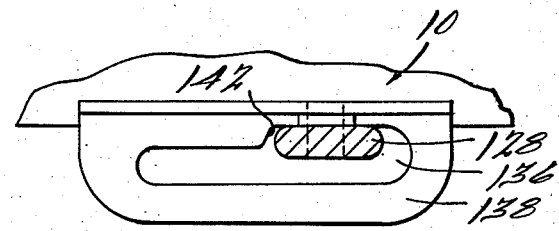
Fig. 6 is an enlarged, fragmentary, vertical sectional view taken on the line 6—6 of Fig. 1.

The two inner struts 14 and 16 are disposed substantially equidistantly on opposite sides of the middle of the beam 12. The struts 18 and 20 are disposed equidistantly from and at the outer sides of the inner struts 14 and 16 and at substantially the middle of ramp portions 68 and 70 which join the depressed middle portion 48 to the flat top portions 60 and 62. The outermost struts 22 and 24 butt the side flanges 53 and 56 respectively and extend forwardly of the beam 12 under the plate 10. As shown in the drawing, the struts 22 and 24 butt edgewise against both the plate 10 and the beam 12. The two inner struts 14 and 16 extend both forwardly and rearwardly of the beam 12 from the front peripheral flange of the plate 10 to the rear peripheral flange thereof. The two struts 18 and 20 extend rearwardly from the beam 12 to the lower peripheral flange of the plate 10. The two outermost struts 22 and 24 extend from the front edge of the beam 12 to the rear peripheral flange of the plate 10. All the struts 14, 16, 18, 20, 22, and 24 are welded to the undersurface of the plate 10 and also to the beam 12. In this connection, it will be observed that each of the four inner struts 14, 16, 18, and 20 has a plurality of depending tabs 72, and all of the tabs extend through elongate slots 74 in the beam. The projecting ends of the tabs 72 form welding dams as shown in Fig. 5 which facilitate welding the struts to the beam 12. Also as shown in Fig. 5, the ramps 68 and 70 preferably are formed to provide horizontal ledges 76 in which the slots 74 are formed.

In fabricating the coupler, the four inner struts 14, 16, 18, and 20 are first welded to the plate 10. The beam 12 is then laid on the plate with the tabs 72 extending through the slots 74 and welded simultaneously to the plate and to the struts. The outermost struts 22 and 24 are then placed in position and welded to the plate 10 and to the beam 12, as shown in Fig. 7. Manifestly, the struts 14, 16, 18, 20, 22, and 24 further strengthen the assembly and impart additional rigidity to the plate 10. Also, the struts transfer weight from the plate 10 to the beam 12 and distribute the load so that the fabricated sheet-metal structure can better withstand the relatively heavy weight normally imposed thereon.

The kingpin hooks 40 and 42 have pivots 77 and 78 journaled in an upper bearing block 80 and lower bearing blocks 82 and 84. The upper bearing block 80 shown by phantom lines in Fig. 7 extends between the two inner struts 14 and 16 and seats upwardly against the undersurface of the plate 10. At its forward edge, the bearing block 80 extends substantially flush with the shoulder 52 and the block extends rearwardly beyond the apex of the V slot 38. Preferably, the block 80 is welded both to the plate 10 and to the adjacent struts 14 and 16. Openings 86 and 88 are provided in the block 80 to receive the pivots 77 and 78. Also, the block 80 is formed in the rearward edge thereof with a notch 90 which registers with and complements the apex portion of the V slot 38. Thus, the block 80 not only provides upper bearings for the pivots 77 and 78 but it also strengthens and reinforces the apex of the V slot 38 at a point where the plate 10 may strike the kingpin with considerable and possibly destructive force particularly during a coupling operation. The lower bearing blocks 82 and 84 butt edgewise against the shoulder 52 and are welded both to the shoulder and to the depressed middle portion 48. Holes 92 and 94 are provided in the blocks 82 and 84 in vertical alignment with the holes 86 and 88 to receive the lower end portions of the pivots 77 and 78.

The kingpin hooks 40 and 42 on the pivots 77 and 78 fit snugly between the upper bearing block 80 and the lower bearing blocks 82 and 84, as perhaps best shown in Fig. 3. The hooks 40 and 42 here shown are a conventional type having forward jaw portions 96 and 98 which engage rearwardly of and snugly fit the kingpin. Lugs 100 and 102 at the inner sides of the jaws 40 and 42 extend around the front of the kingpin. When the kingpin hooks 40 and 42 are closed with the jaw portions 96 and 98 and the lugs 100 and 102 in engagement, as shown in Fig. 1, they define a circular opening 104 that will accommodate and snugly fit a conventional kingpin. Forwardly of the pivots 77 and 78 the kingpin hooks 40 and 42 are formed with arms 106 and 108; and, when the hooks are closed as shown in Fig. 1, the arms butt against stops 110 and 112 welded on the front depressed portion 50 of the beam 12. Means hereinafter described in detail are provided for locking the arms 106 and 108 against the stops 110 and 112 and thus holding the jaws 96 and 98 closed on the kingpin.

In practice, the kingpin hooks 40 and 42 are rocked on the pivots 77 and 78 to open the jaws 96 and 98 and to release the kingpin merely by disengaging the locking means from the arms 106 and 108, setting the brakes on the trailer and pulling the tractor out from under the trailer. Pressure of the kingpin against the jaws 96 and 98 opens the latter as the tractor moves forward. Conversely, the trailer is coupled to the tractor merely by backing the latter under the forward end of the trailer. As the tractor moves back, the kingpin passes through the V slot 38 to the apex portion thereof when it engages the lug portions 100 and 102 of the normally open hook jaws. As the kingpin pushes against the lugs 100 and 102, the latter rock the hooks 40 and 42 to close the jaws 96 and 98 on the kingpin. The arms 106 and 108 are then locked to hold the jaws closed.

As suggested, it is conventional to provide some means for holding the kingpin hooks 40 and 42 closed so as to prevent indvertent release of the kingpin in use, and it is contemplated in so far as the instant invention is concerned, that any suitable or conventional means may be employed for this purpose. The particular means here shown comprises a latch bar 114 slidably mounted to move rearwardly between the arms 106 and 108 or forwardly to a position released from the arms. A U-shaped sheet-metal guide 116 on the undersurface of the plate 10 supports and confines the bolt 114 for movement to and from the kingpin hooks 40 and 42. When the bar 114 is at the forward limit of its travel, it fits snugly between the arms 106 and 108 to press the arms against the stops 110 and 112 whereby to hold the jaw portions 96 and 98 closed on the kingpin. Preferably, the arms 106 and 108 are formed at the inner sides thereof with tapered cam surfaces 118 and 120, and the bar 114 is formed with a rounded bullet nose 122 which engages the cam surfaces as the bar advances to close the jaws in the event they are not fully closed by the kingpin in the manner hereinabove described. A rod 124 threaded into the forward end of the bar 114 extends forwardly in the guide 116 and through an opening in the depending flange of the plate 10, and a helical spring 126 confined between the flange and the bar normally urges the later to the advanced or locked position.

The latch bar 114 is operated by means of a handle 128 pivoted as at 129 to and below the plate 10. On the inner end of the handle 28 is a bracket 130 having a generally L-shaped slot 132 which receives the downwardly bent end 134 of the rod 124. Outwardly of the pivot 129 the handle 128 extends through an elongate slot 136 in a bracket 138 also fastened to the plate 10. For convenience in operation the handle 128 preferably extend a substantial distance to one side of the coupler so that it is readily accessible from the side of the trailer. In any event the handle can be moved between the full-line and the broken-line positions as shown in Fig. 1, and a spring 140 connected at one end to the inner terminal portion of the handle and at the other end to the beam 12 normally urges the handle to the full-line position. When the handle 128 is in the full-line position, the latch bar 114 is advanced to hold the kingpin hooks 40 and 42 closed. As the handle is moved from the full-line to the broken-line position, it swings the bracket 130 outwardly, as shown in Fig. 1, and pulls on the rod 124 to retract the latch bar 114 out of engagement with the arm portions of the kingpin hooks 40 and 42. In this connection it will be observed that the handle 128 normally is received in an upwardly offset recess 142 in the slot 136 which confines it and holds it normally in the full-line position. In order to move the handle 128 to the broken-line position so as to pivot the latch bar 114, it is necessary to press downwardly on the handle sufficiently to move it out of the lateral recess 142 and into register with the elongate lower portion of the slot 136. When this is done the handle can be swung freely to withdraw the latch bar 114. It will be readily apparent, however, that the offset recess 142 serves as a safety feature which prevents inadvertent movement of the handle and consequential inadvertent opening of the hooks 40 and 42 to disengage the kingpin. Also, the springs 126 and 140 which normally hold the latch bar 114 engaged with the hooks provide additional safety features.

The coupler plate 10 is identically mounted on the two supports 34 and 36, and a detailed description of the support 34 only, therefore, is given. As suggested, both of the supports 34 and 36 are disposed under the portions of the plate 10 which project beyond the ends of the beam 12 and between the end flanges 30 and 32 of the beam and the depending flange portions 26 and 28 of the plate. Thus, the end flanges 30 and 32 provide inboard supports for the mountings, and the flange portions 26 and 28 provide outboard supports therefor. The two supports 34 and 36 are made of essentially flexible and resilient metal strap material and they are formed with upwardly arched middle portions 143 and 144 which provide essentially springy mountings for the plate 10.

Figure 4:
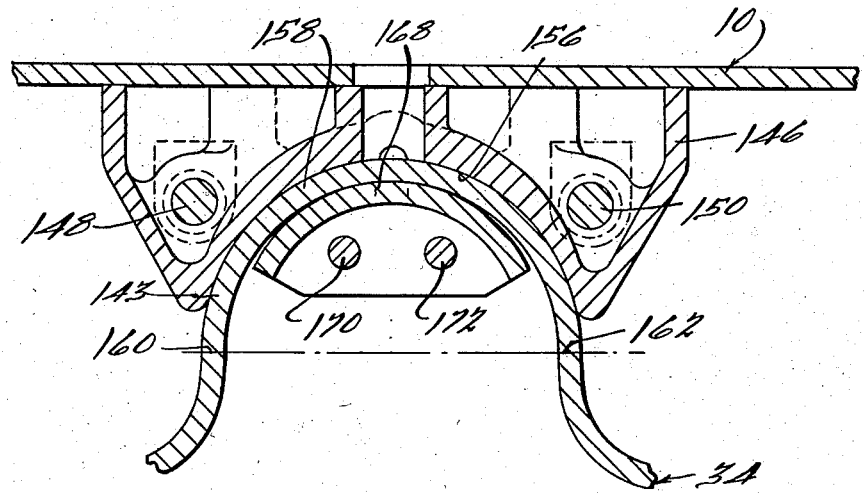
Fig. 4 is an enlarged, fragmentary, vertical sectional view taken on the line 4—4 of Fig. 1.

More particularly, the mounting which includes the support 34 comprises a bracket bearing 146 under the projecting marginal portion of the plate 10 and fastened to the outboard and inboard flange supports 26 and 30 by bolts 148 and 150. In this connection it will be observed that the outboard flange 26 is strengthened by a reinforcing plate 152 welded thereto at the outer side thereof and the inboard flange 30 is strengthened by a reinforcing plate 154 similarly welded thereto. The bearing 146 seats downwardly on the support 34, as shown in Fig. 4, and the undersurface 156 thereof is arcuately curved so that it conforms to and snugly fits the crown portion 158 of the support. It is significant that the crown portion 158 extends along an essentially uniform radius to substantially the points 160 and 162 which are spaced below the ends of the bracket bearing 146 when the latter occupies the balanced or central position shown in Fig. 4. Thus, the bearing 146 is free to rock for a limited distance in both directions from the central position to the ends of the crown portion 158. This rocking movement of the bearing permits tilting of the plate 10 about a horizontal axis in the manner hereinabove described. A wear plate 164 is provided on the inner side of the outboard flange 26, and a wear plate 166 is provided on the reinforcing plate 154 of the inboard supporting flange 30 for frictional engagement with the edges of the support 34. A bearing retainer 168 under the support 34 and fastened to the flanges 26 and 30 by bolts 170 and 172 limits upward movement of the plate 10 to prevent inadvertent disengagement thereof from the supports 34 and 36.

The supports 34 and 36 provide an essentially lightweight mounting means for the coupler plate 10 and, in addition, the essentially flexible and resilient character of the supports provides a springy mounting which is desirable particularly when coupling the trailer to the tractor. Also, the inherently resilient nature of the supports 34 and 36 provides a desirable springy action when traveling which absorbs vibration and prevents destructive rattling and relative motion between the parts. Experience has shown that the strap-type support is adequate if the superimposed bracket bearings extend over substantially the entire area of the crown portions 158. The bearings 146 must of course terminate far enough back from the ends of the crown portions 158 to permit whatever rocking motion is required for the plate 10, but they should cover as large a surface area of the crown portions as possible. If the bearings 146 are too small, they concentrate the load on too small an area of the supports 34 and 36 and the latter will fail in use. However, if the contact areas of the bearings 146 are made relatively large as shown in the drawing, the construction shown is adequate for its intended purpose.

It may thus be seen that we have achieved the objects of our invention. We have provided a lower coupler assembly for truck tractors and the like that is essentially light in weight and at the same time is adequately strong and rugged. The lightweight feature of the coupler permits the pay load of the trailer to be correspondingly increased, and this is an important consideration in the trailer art. In addition, the lower coupler assembly of this invention is uniquely constructed so as to provide an essentialy springy action which is desirable when coupling the trailer to the tractor and which absorbs destructive vibrations on the road.

Having thus described the invention, we claim:

1. A fifth wheel lower coupler for truck tractors and the like including a formed sheet-metal fifth wheel supporting plate, and a hollow, elongate, transverse sheet-metal beam under the middle portion of said plate, said beam being fastened securely to the plate and strengthening and reinforcing the middle portion thereof, said plate extending laterally of said beam at both ends of the latter, the projecting portions of said plate having depending flanges and the ends of said beam being formed with down-turned flanges, said beam flanges being spaced from said plate flanges, and said flanges collectively defining mounting means for said coupler.

2. A fifth wheel lower coupler for truck tractors and the like comprising a formed sheet-metal fifth wheel supporting plate, a hollow, elongate, transverse sheet-metal beam under the middle portion of said plate and fastened securely thereto, said beam strengthening and supporting the middle portion of said plate and including depending end flanges forming inboard bearing mountings, said plate projecting laterally beyond the ends of said beam, depending flanges on the projecting portions of said plate forming outboard bearing mountings, and bearing support means under the projecting portions of said plate and connected to said flanges rockably supporting said coupler for tilting movement about a horizontal axis.

3. A fifth wheel lower coupler for truck tractors and the like comprising a formed sheet-metal fifth wheel supporting plate, a hollow, elongate, transverse sheet-metal beam under the middle portion of said plate and fastened securely thereto, said beam strengthening and supporting the middle portion of said plate and including depending end flanges forming inboard bearing mountings, said plate extending beyond the ends of said beam, depending flanges on the extending portions of said plate spaced laterally of and opposite the adjacent ends of said beam, upper bearing members between each pair of opposed flanges fastened thereto and having arcuately curved undersurfaces, and arched flexible and resilient bearing straps disposed with the crown portions thereof engaging the curved undersurfaces of said bearing members and supporting said coupler for tilting movement about a horizontal axis.

4. A fifth wheel lower coupler for truck tractors and the like comprising a formed sheet-metal fifth wheel supporting plate, a formed elongate transverse sheet-metal beam under and connected to the middle portion of said plate strengthening and reinforcing said middle portion, said beam having depending flanges at the ends and sides thereof welded together at the corners of the beam, and said end flanges forming inboard supporting members, said plate projecting beyond the ends of the beam and the projecting portions thereof formed with depending flanges forming outboard bearing supporting members, arched, flexible and resilient bearing straps under the projecting portions of said plate, bearing members between and fastened to said inboard and outboard supporting members having curved undersurfaces seating downwardly on the crown portions of said straps, and bearing retainers fastened to said inboard and outboard supports below the crown portions of said straps co-operating with said bearings in holding said fifth wheel supporting plate on said straps.

5. A fifth wheel lower coupler for truck tractors and the like comprising a formed sheet-metal fifth wheel supporting plate, and a hollow, elongate, transverse sheet-metal beam under the middle portion of said plate and fastened securely thereto, said plate projecting beyond the ends of said beam, laterally spaced pairs of depending flanges on the projecting portions of said plate and at the ends of said beam, springy and resilient arched bearing straps disposed with the crown portions thereof under the extending portions of said plate, upper bearing members also under the projecting portions of said plate fastened to said flanges and having curved undersurfaces seating on and complementing the crown portions of said strap, said bearing members having a relatively large surface area of contact with said straps but terminating short of the ends of said crown portion to permit said bearings to rock on said strap to tilt said plate, and bearing retainers fastened to said flanges under said straps for holding said bearing members on said straps.

6. A fifth wheel lower coupler for truck tractors and the like comprising a formed sheet-metal fifth wheel supporting plate, an elongate sheet-metal beam under and extending transversely of said plate and connected securely thereto, said beam having a depressed middle portion spaced from said plate and said depressed portion having a formed vertical shoulder, upper and lower bearing blocks between said plate and the depressed portion of said beam, said lower bearing blocks butting against and reinforced by said shoulder, and kingpin hooks between and pivoted to said bearing blocks.

7. A fifth wheel lower coupler for truck tractors and the like comprising a formed sheet-metal fifth wheel supporting plate, an elongate sheet-metal beam under and extending transversely of said plate and fastened securely thereto, said beam having a depressed middle portion spaced from said plate and said middle portion having a vertically formed shoulder, vertical reinforcing struts interposed between said plate and said beam, upper and lower bearing members interposed between said plate and the depressed portion of said beam, said lower bearing members butting against and reinforced by said shoulder, said upper bearing blocks butting against and reinforced by said struts, and kingpin hooks interposed between and pivoted to said bearing blocks.

8. A fifth wheel lower coupler for truck tractors and the like comprising a formed sheet-metal fifth wheel supporting plate having a V slot therein for receiving a trailer kingpin, an elongate sheet-metal beam under and extending transversely of said plate, said beam having a depressed middle portion spaced from said plate and said depressed portion having a vertically formed shoulder at substantially the middle thereof, upright sheet-metal struts interposed between and butting edgewise against said plate and the depressed portion of said beam, an upper bearing member on the undersurface of said plate butting endwise against adjacent struts and having a notch in one edge thereof disposed to register with and conforming to the apex of said V slot, lower bearing members on said beam at opposite sides of said V slot butting against and reinforced by said shoulder, and kingpin hooks interposed between and pivoted to said upper and lower bearing members.

9. A fifth wheel lower coupler for truck tractors comprising a welded assembly including a formed sheet-metal fifth wheel supporting plate having a V slot therein for receiving a trailer kingpin, an elongate sheet-metal beam under and extending transversely of said plate, said beam having depending connected flanges at the ends and sides thereof, and a depressed middle portion spaced from said plate, the depressed middle portion of said beam having a formed vertical shoulder therein behind the apex of said V slot, said plate projecting beyond the ends of said beam and the projecting portions thereof having depending flanges forming outboard bearing supports, upright sheet-metal struts interposed between and butting endwise against the plate and the depressed portion of said beam, an upper bearing member on the undersurface of said plate having a notch in one edge thereof disposed to register with and conforming with the apex of said V slot, lower bearing members on said beam at opposite sides of said V slot butting against and reinforced by said shoulder, kingpin hooks interposed between and pivoted to said upper and lower bearing members also at opposite sides of said V slot, and mounting means rockably supporting said plate for tilting movement about a horizontal axis, including bearing members interposed between and fastened to said outboard supports and the end flanges of said beam.

10. A fifth wheel lower coupler for truck tractors comprising a formed sheet-metal fifth wheel supporting plate having a V slot therein for receiving a trailer kingpin, an elongate sheet-metal beam under and extending transversely of and welded to said plate, said beam having depending flanges at the ends and sides thereof welded together at the corners of the beam and a depressed middle portion spaced from said plate, said depressed middle portion having a formed vertical shoulder therein behind the apex of said V slot, said plate projecting beyond the ends of said beam and the projecting portions thereof having depending flanges forming outboard bearing supports, upright sheet-metal struts interposed between and butting endwise against the plate and the depressed portion of said beam, an upper bearing member on the undersurface of said plate having a notch in one edge thereof disposed to register with and conforming with the apex of said V slot, lower bearing members on said beam at opposite sides of said V slot butting against and reinforced by said shoulder, kingpin hooks interposed between and pivoted to said upper and lower bearing members at opposite sides of said V slot, arched supporting straps under the projecting portions of said plates and bearing members interposed between and fastened to said outboard supports and the end flanges of said beam surmounting said straps, said bearing members having curved undersurfaces receiving and conforming to the crown portions of said straps and rockable thereon to tilt said plate.

11. A fifth wheel lower coupler for truck tractors and the like comprising a formed sheet-metal fifth wheel supporting plate having a V slot therein for receiving a trailer kingpin, an elongate sheet-metal beam under and extending transversely of said plate, said beam having a depressed portion spaced from said plate and said depressed portion having a vertically formed shoulder behind said V slot, strengthening and reinforcing means between said plate and the depressed portion of said beam, an upper bearing member on the undersurface of said plate having a notch in one edge thereof disposed in register with and conforming to the apex of said V slot, lower bearing members on said beam at opposite sides of said slot butting against and reinforced by said shoulder, and kingpin hooks interposed between and pivoted to said upper and lower bearing members.

12. A fifth wheel lower coupler for truck tractors and the like comprising a formed sheet-metal fifth wheel supporting plate having a V slot therein for receiving a trailer kingpin, an elongate sheet-metal beam under and extending transversely of said plate, said beam having depending flanges at the ends and sides thereof welded together at the corners of the beam and a depressed middle portion spaced from said plate, said depressed middle portion having a formed vertical shoulder therein behind the apex of said V slot, strengthening and reinforcing means interposed between said plate and the depressed portion of said beam, an upper bearing member on the underside of said plate having an edge notch registering with and complementing the apex portion of said V slot, lower bearing members on said beam butting edgewise against and reinforced by said shoulder, and kingpin hooks disposed between and pivoted to said upper and lower bearing members.

13. A fifth wheel lower coupler for truck tractors and the like comprising a formed sheet-metal fifth wheel supporting plate having a V slot therein for receiving a trailer kingpin, an elongate sheet-metal beam under and extending transversely of said plate, said beam having depending flanges at the ends and sides thereof welded together at the corners of the beam and a depressed middle portion spaced from said plate, said depressed middle portion having a formed vertical shoulder therein behind the apex of said V slot, strengthening and reinforcing means interposed between said plate and the depressed portion of said beam, an upper bearing member on the underside of said plate having an edge notch registering with and complementing the apex portion of said V slot, lower bearing members on said beam butting edgewise against and reinforced by said shoulder, kingpin hooks disposed between and pivoted to said upper and lower bearing members, depending flanges on said plate outwardly of and spaced from the end flanges of said beam, and upright mountings between the end flanges of said beam and the flanges of said plate rockably supporting the plate for tilting movement about a horizontal axis.

References Cited in the file of this patent

UNITED STATES PATENTS

| | | |
|---|---|---|
| 1,992,710 | Matthaei | Feb. 26, 1935 |
| 2,138,679 | Sherman | Nov. 29, 1938 |
| 2,140,990 | Emrick | Dec. 20, 1938 |
| 2,468,013 | Kayler | Apr. 19, 1949 |
| 2,530,311 | Nabors | Nov. 14, 1950 |